Nov. 1, 1966 J. A. DENNER ETAL 3,283,283
PRESSURE TRANSDUCERS
Filed Feb. 4, 1964 2 Sheets-Sheet 1
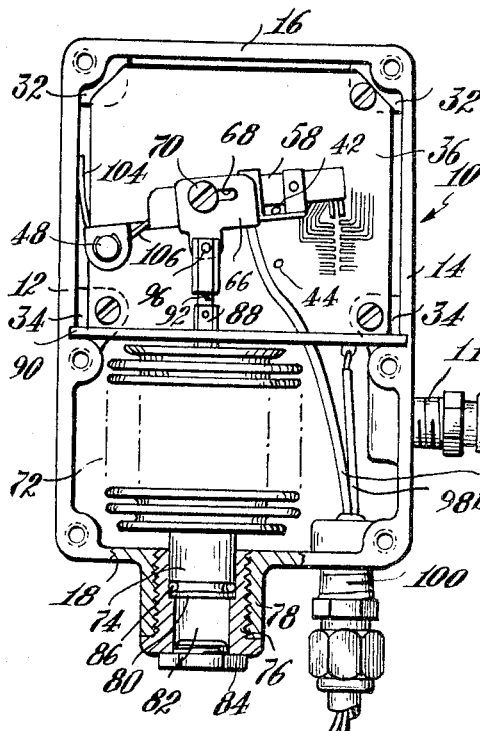
Fig. 1
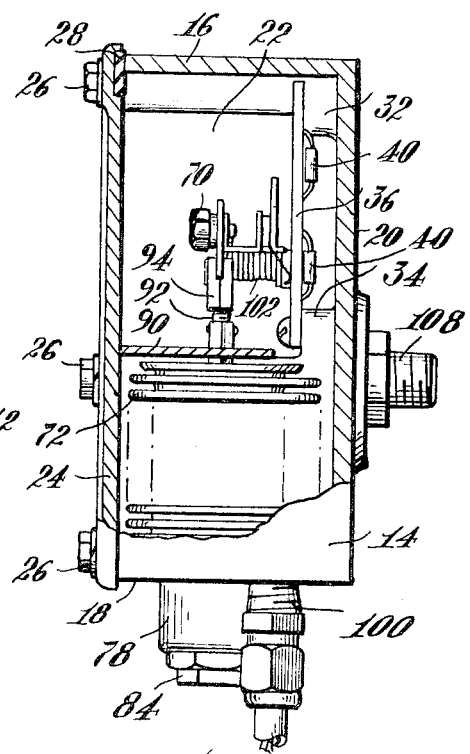
Fig. 2
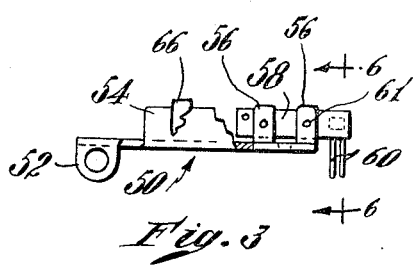
Fig. 3
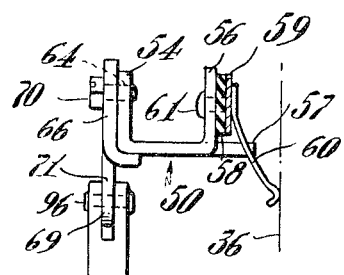
Fig. 6
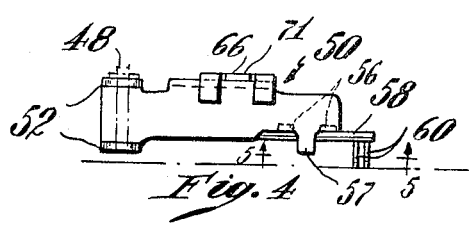
Fig. 4
Fig. 5
INVENTORS
John A. Denner
Robert D. Reis
by Roberts, Cushman & Grover
ATT'YS

United States Patent Office 3,283,283
Patented Nov. 1, 1966

3,283,283
PRESSURE TRANSDUCERS
John A. Denner, West Roxbury, and Robert D. Reis, Hingham, Mass., assignors to United Electric Controls Company, Watertown, Mass., a corporation of Massachusetts
Filed Feb. 4, 1964, Ser. No. 342,446
3 Claims. (Cl. 338—194)

This invention relates to pressure transducers and has for its principal objects to provide a transducer adapted to introduce a change in resistance for a change in pressure which may be read at a remote station, either as a resistance change or by a voltmeter, for example, for the purpose of detecting leakages in pressurized conductors used in communication lines and the like; for indicating pressure fluctuations in industrial processes, including maintenance of predetermined minimum or maximum pressures or in mechanical systems in which predetermined pressures are essential to their operation and maintenance; to provide a transducer which is small enough to be used in installations with limited space; which may be mounted in any position without impairment of its accuracy; which is light enough so that it can be used when there are limitations as to weight; which is pressure-tight and hence not adversely affected by atmospheric conditions; which is substantially immune to vibration; which can be readily adjusted for a zero position and for precision throughout its operation; and which is durable.

As herein illustrated, the device comprises a pressure-tight chamber constructed, for example, of die-cast aluminum, within which there is mounted a rigid non-conductive panel, for example, of phenolic resin which is resistant to changes in dimensions, on which there are mounted pairs of terminals, preferably of nickel rhodium to provide for long wear. The pairs of terminals are arranged in a bank and are adapted to be bridged in succession by a brush which, in movement from one pair to the next, add or subtract, according to the direction of movement, a resistance of predetermined amount for each change in pressure of a predetermined amount. The brush is in the form of an arm pivotally supported at one end on the panel, parallel thereto, with its distal end opposite the bank of terminals and has on it brush elements which lightly bear against the panel and are moved by the arm between limit stops at opposite ends of the banks. A pressure-displaceable element in the form of a bellows is mounted in the chamber with one end adjacent the arm and a link pivotally connects the adjacent end of the bellows to the arm intermediate its ends. In its undisplaced condition the pressure-displaceable element holds the brush arm against the limit stop at one end of the bank of terminals and a spring operates on the arm to move it toward the opposite end of the bank in opposition to the displaceable element, so that, as the latter is displaced by an increase in pressure within the chamber, the brush arm moves along the bank. The chamber is provided with an opening through which the pressure to be measured is delivered to the interior of the chamber thus to effect displacement of the pressure-displaceable element specifically to compress the bellows. The bellows is supported at the end opposite the arm in a bearing provided with an adjusting screw, by means of which the bellows may be shifted relative to the arm to establish a zero position. Precision of the movement of the brush from one pair of terminals to the next is provided by an adjustable bracket connecting the link from the bellows to the arm.

The displacement of the bellows may take place either as a result of an increase in pressure within the chamber or a decrease in pressure within the chamber depending upon the initial posture of the bellows, that is, the bellows may be initially extended so that an increase in pressure within the chamber shortens it or it may be initially compressed so that a decrease in pressure within the chamber lengthens it. The initial posture of the bellows may be provided either by its inherent elasticity or by an internally disposed spring. Optionally, the chamber may be sealed and a conductor may be connected to the interior of the bellows so as to effect its expansion or contraction.

The invention will now be described in greater detail with reference to the accompanying drawings wherein:

FIG. 1 is a front view of the instrument with the cover removed to show the interior and with parts in section;

FIG. 2 is an elevation of the right side of the instrument with the side wall broken away to show the interior with parts in elevation and in section;

FIG. 3 is an elevation of the brush arm removed from the instrument partly in section;

FIG. 4 is a bottom view of the brush arm;

FIG. 5 is a section taken on the line 5—5 of FIG. 3;

FIG. 6 is an elevation of the distal end of the arm, to larger scale, showing a brush;

Figure 7:
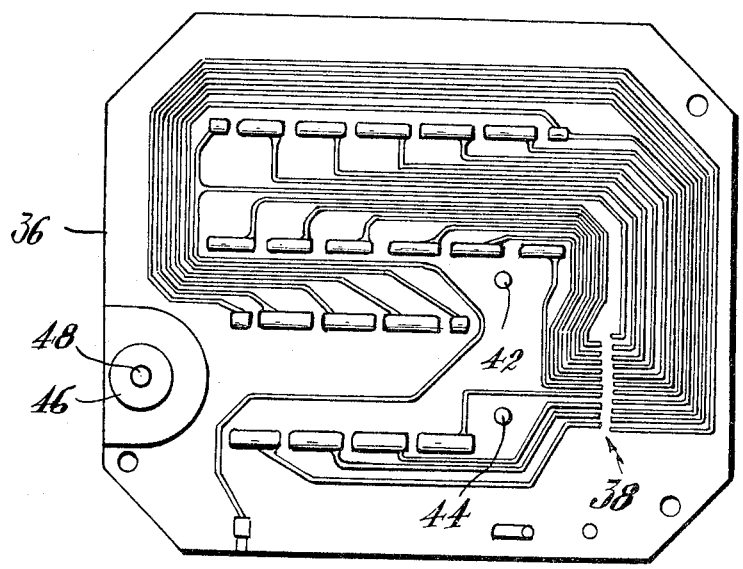
FIG. 7 is an enlarged elevation of a printed circuit panel removed from the device, showing the bank of terminals along wihch the brushes are removed.

Referring to the drawings (FIGS. 1 and 2), the instrument has a case of substantially rectangular configuration having spaced parallel side walls 12 and 14, top and bottom walls 16 and 18, and a back wall 20 which provides a chamber 22 open at the front side. A cover 24 is secured to the front side of the chamber by bolts 26 and is provided with a peripheral recess 28 within which there is disposed an elastic gasket 28 by means of which the chamber is made pressure-tight.

Bosses 32 are provided in the back wall of the chamber at the upper corners interiorly thereof and bosses 34 are provided on the back wall intermediate the top and bottom containing threaded openings by means of which a printed circuit panel 36, of rigid phenolic resin, is secured within the chamber by means of bolts inserted through the panel into the threaded openings in the bosses.

Figure 8:
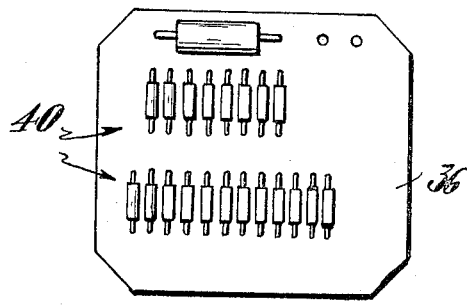
FIG. 8 is a smaller elevation of the printed circuit panel, as seen from the back, showing the resistors which are added in series by bridging of the terminals.
Figure 9:
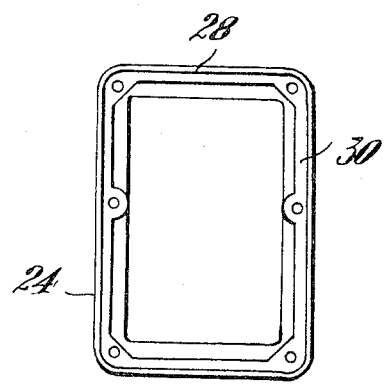
FIG. 9 is an inside plan view of the cover showing the sealing gasket by means of which the chamber is made pressure-tight.

The panel 36 (FIG. 7) has on it a bank of pairs of terminals 38 arranged so that, by bridging one pair after another, resistances 40 of predetermined amount are added or subtracted in series, the latter being shown on the back side of the panel (FIG. 8). Limit pins 42 and 44 are positioned on the panel at opposite ends of the bank. A bearing element 46 is fastened to the panel for supporting a shaft 48 at right angles thereto and a brush arm 50 is pivotally mounted on the shaft, parallel to the panel, with its distal end opposite the bank of terminals. The arm has spaced parallel ears 52 for receiving the shaft, an upstanding flange 54 along one side, a pair of spaced upstanding ears 56 at the other side, and a lug 57 situated between the ears and extending laterally from the arm. A block of insulation 58 and a thin copper conductor 59 are secured to the ears 56, by rivets 61 clinched against their inner sides, to fix the insulation and conductor rigidly to the ears. A pair of thin spring fingers 60 are soldered to one end of the copper strip 59 so as to extend downwardly and rearwardly therefrom into light contact with the surface of the panel 36, the ends of the fingers being crimped to provide for sliding contact with the panel. The flange 54 contains one or more set of holes 64 and an angle plate 66 is adjustably attached thereto by means of a slot 68 in the plate and a screw bolt 70 which is adapted to be inserted through the slot and threaded into one of the holes 64. The angle plate has a limb 69 projecting downwardly therefrom which contains a hole 71.

In the lower part of the chamber there is mounted a pressure-displaceable element 72 in the form of a metal bellows. The lower end of the bellows has a boss 74 of cylindrical cross-section seated in a bushing 76, the latter being threaded into an internally threaded, cylindrical extension 78 in the bottom wall 18 of the chamber. The bushing has an axial opening of two diameters providing a shoulder 80 against which the lower end of the boss 74 rests. An adjusting screw 82 is mounted in the threaded portion for engagement with the boss and may be rotated to adjust the axial position of the boss in the bushing and hence the position of the bellows 72 in the chamber relative to the arm. The boss 74 has near its extremity an annular groove in which there is seated a sealing ring 86 to maintain the chamber pressure-tight while permitting adjustment of the bellows. A cap 84 is threaded into the bushing over the adjusting screw. An internally threaded stem 88 is pivotally secured to the end of the bellows adjacent the brush arm, passes upwardly through a guide plate 90, and is connected by a threaded element 92 to an internally threaded link 94, the latter being pivotally connected to the limb 71 by a pin 96. By adjustment of the bellows, as related above, the zero position of the brush arm may be established in engagement with the limit pin 42, that is, with the bellows in an uncompressed position. By adjustment of the angle plate 66, the precision of movement of the arm from one pair of contacts to the next may be adjusted. The lug 57 on the arm, by contact with the limit pins 42, 44, limit movement of the arms to the opposite ends of the bank of terminals.

Electrical conductors 98a and 98b from the brush arm and the circuitry of the plate 36 extend downwardly through the bottom wall 18 and a threaded nipple 100 to the exterior of the instrument, the passage of the conductors through the wall being sealed with suitable means to maintain the chamber pressure-tight.

A coiled spring 102 is mounted on the shaft 48 with one end 104 bearing against the inside of the wall 12 above the shaft and the other end 106 bearing against the upper side of the arm, the spring operating to depress the arm, that is, to move it downwardly against the supporting effect of the bellows 72. Thus, as the bellows is compressed, the brush arm is moved in a clockwise direction with respect to its supporting shaft so as to move the brushes 60 from the upper end of the bank of terminals toward the lower end, this movement being limited by the stop pin 44 heretofore referred to.

The back wall of the chamber is provided with a coupling 108, to which may be connected a conductor for supplying the pressure, which is to be measured to the interior of the chamber, externally of the bellows 72 thereby to compress the bellows. The bellows is designed so that for each ¼ pound of pressure per square inch increase, the brush arm will be moved from one pair of terminals to the next and, as previously related, introduce a ¼ watt resistance. Obviously, the increment of increase or decrease in resistance for each increment of increase or decrease in pressure may be changed to suit the particular specifications of the installation.

Figure 11:
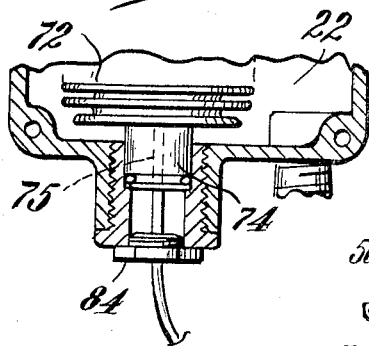
FIG. 11 is a fragmentary section of the device in which the pressure is delivered to the interior of the bellows.

The bellows is operable to measure a decrease in pressure as well as an increase in pressure by the simple expedient of prestressing so that it is initially extended or initially compressed. If the bellows is initially extended so that it normally holds the brush arm 50 against the stop 42, an increase in pressure within the chamber will shorten it thereby allowing the brush to move away from the stop 42 toward the stop 44. If the bellows is initially compressed so that the brush arm 50 is held against the stop 44, a decrease in pressure within the chamber will lengthen it thus moving the brush arm 50 from a position adjacent the stop 44 toward the stop 42. The initial posture of the bellows may be provided by a spring S (FIG. 1) located in the bellows. Alternatively, the chamber 22 may be sealed and the pressure to be measured connected to the interior of the bellows as shown in FIG. 11. Conveniently, this may be accomplished by drilling a hole 75 through the boss 74 and inserting a flexible tube through the cap 84 into the hole 75.

Figures 10, 12:
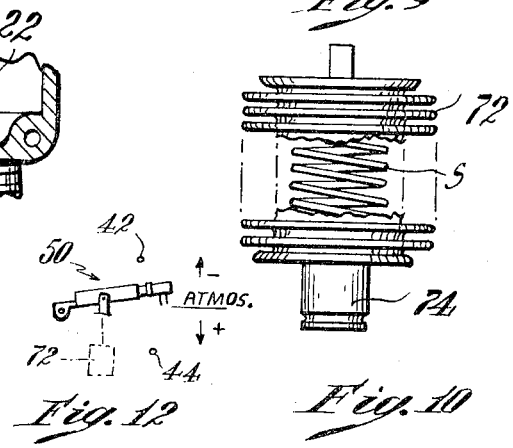
FIG. 10 is a section of a bellows provided with an internal spring for preloading it in tension or compression.
FIG. 12 is a diagrammatic view of the device with the bellows prestressed to hold the brush arm at a point intermediate the ends of the bank of terminals for movement in either direction along the bank depending upon the change in pressure within the chamber.

It is within the scope of the invention to prestress the bellows 72 so that the arm occupies some position intermediate the ends of the bank of terminals as shown in FIG. 12, so that, depending upon whether the pressure within the chamber increases or decreases, the arm is moved one way or another along the bank.

By evacuating the bellows, absolute and source pressures may be measured by external application to the bellows; by venting the casing gauge pressures may be measured by application to the interior of the bellows; and by applying pressures internally and externally to the bellows, pressure differentials may be measured.

A nipple 110 is threaded into the right-hand wall 14 and provides means for attachment of a test valve. The nipple is normally closed by a cap 112.

The device is relatively small, having a heightwise dimension of 3⅞ inches, a widthwise dimension of 2¹¹⁄₁₆ inches, and a front-to-back thickness of 2³²⁄₃₂ inches thus providing a turning radius of 2¾ inches, so that it is especially adapted for use in cramped quarters where there is little space available, and furthermore making it possible to adjust the position of the instrument to fit into almost any small space regardless of its location since its position does not adversely affect its operation. The maximum free volume of the chamber is 7.5 cubic inches and the weight 17 ounces. The bank of terminals is arranged on a radius of 1.750 inches, has an overall length from top to bottom of .420 inch, and the terminals have a spacing of .02 inch. Each terminal has a width of .020 inch and is comprised of low resistant nickel rhodium. The circuit panel is a phenolic resin of ³⁄₃₂ inch in thickness.

Optionally, the case may be constructed about half size by omitting the lower half which contains the bellows and attaching a cylindrical bellows casing and bellows to the wall of the case.

It should be understood that the present disclosure is for the purpose of illustration only and that this invention includes all modifications and equivalents which fall within the scope of the appended claims.

We claim:

1. In a transducer operative to change the resistance in a circuit in proportion to a change in pressure, a non-conductive panel on which the circuit is printed, said printed circuit including a bank of pairs of spaced terminals arranged in series to add to or remove resistance from the circuit with their exposed surfaces substantially in the plane of the panel, said terminals being comprised of nickel rhodium and embodying within a linear distance on the panel of approximately .420 inch ten pairs of terminals, a brush arm, means pivotally supporting the brush arm for movement parallel to the plane of the panel, a pair of spaced brushes mounted on the arm for movement lengthwise of the bank of terminals, said brushes comprising spring fingers biased to bear yieldingly against the bank of terminals and having convex end portions at their distal ends which have tangential contact with the terminals, said brushes being insulated from the arm but providing a closed circuit across any pair of contacts when they make contact, and conductors connecting the brushes and the contacts in the circuit.

2. In a transducer operative to change the resistance in a circuit in proportion to a change in pressure, a rigid non-conductive panel, a bank of pairs of spaced terminals on the panel arranged in series to add to or remove resistances from the circuit, a pin fixed to the panel perpendicular to said panel, a rigid brush arm, spaced perforated ears at one end of the arm pivotally mounting the arm on the pin with one side substantially parallel to the panel, a pair of upstanding ears at said one side of the arm near its distal end, an insulator secured to the ears substantially parallel to the panel, a pair of elastically resilient brush wires secured to the insulation, said brush wires projecting from the insulation downwardly and inwardly into yielding contact with the bank of terminals for sliding movement of the brushes along the bank of terminals, a coiled spring mounted on the pin operating on the arm to bias it in one direction, a pair of spaced limit pins fixed to the face of the panel, and a lug projecting inwardly from the arm from between the ears operable, by engagement with the pins, to limit movement of the arm beyond a predetermined position in either direction of its movement along the bank of terminals.

3. In a transducer operative to change the resistance in a circuit in proportion to a change in pressure, a non-conductive panel, a bank of pairs of spaced terminals on the panel arranged in series to add to or remove resistances from the circuit, a pin fixed to the panel perpendicular to said panel, a rigid brush arm, spaced perforated ears at the proximal end of the arm pivotally supporting the arm on the pin wtih one side parallel to the panel and with its distal end adjacent the bank of terminals, an insulator mounted on the inner side of the arm, a pair of resilient brushes mounted on the insulation in a downwardly and inclined direction for contact of their extremities with the bank of terminals, spring means operative on the arm to urge the arm in one direction along the bank of terminals, spaced pins on the panel and a lug on the arm cooperable therewith to limit movement of the arm relative to the bank of terminals, a flange on the opposite side of the arm containing a threaded hole, a connector plate for connecting the arm to means for effecting movement thereof in proportion to the change in pressure, and a screw bolt adjustably securing the connector plate to the flange.

References Cited by the Examiner

UNITED STATES PATENTS

| | | | |
|---|---|---|---|
| 770,405 | 9/1904 | Tracy | 338—194 X |
| 1,204,675 | 9/1914 | Lyon. | |
| 1,398,792 | 11/1921 | Paulin. | |
| 2,178,422 | 10/1939 | Heagney | 73—398 X |
| 2,384,894 | 9/1945 | Curtis. | |
| 2,613,329 | 10/1952 | Hewes | 338—41 |
| 2,831,094 | 4/1958 | Bourns et al. | 338—125 |
| 2,857,495 | 10/1958 | Bourns et al. | 73—398 X |
| 2,985,859 | 5/1961 | Deniston | 338—125 |
| 3,033,039 | 5/1962 | McMillan | 73—398 |
| 3,160,014 | 12/1964 | De Julio et al. | 73—398 |

LOUIS R. PRINCE, *Primary Examiner.*

D. O. WOODIEL, *Assistant Examiner.*